Patented Jan. 5, 1937

2,066,496

UNITED STATES PATENT OFFICE 2,066,496

HYDROGENATION AND DE-HYDROGENATION

Marion D. Taylor, Berkeley, Calif., assignor to Shell Development Company, San Francisco, Calif., a corporation of Delaware No Drawing. Application April 29, 1935, Serial No. 18,884

22 Claims. (Cl. 260—134)

This invention relates to a novel process for effecting the hydrogenation of an unsaturated organic compound while simultaneously effecting the dehydrogenation of an organic oxy compound in contact therewith, the reaction involving an interchange of hydrogen whereby the unsaturated compound is hydrogenated while the oxy compound is dehydrogenated.

The process of the present invention comprises treating an organic compound containing an olefinic linkage between two aliphatic carbon atoms with a dehydrogenatable organic oxy compound in the presence of a suitable catalyst capable of catalyzing the reaction under conditions of temperature, pressure and contact time at which the oxy compound is dehydrogenated and the unsaturated compound hydrogenated.

My invention provides a practical and economical process for the production of valuable saturated hydrocarbons and valuable carbonylic compounds of the class consisting of aldehydes and ketones. An olefine, which term is intended to include the olefines as ethylene and its homologues as well as olefine polymers, olefine condensation products, and olefine substitution products, may be converted in excellent yield to the corresponding saturated compound by reacting it with an aliphatic primary or secondary monohydric alcohol containing at least two carbon atoms in the presence of a hydrogenation-dehydrogenation catalyst under conditions at which the olefine is hydrogenated while the alcohol is dehydrogenated to an aldehyde or ketone, respectively, depending upon whether the alcohol is primary or secondary.

This invention is applicable with excellent results to the liquid as well as vapor phase hydrogenation of the higher olefines and olefine polymers to valuable saturated hydrocarbons which are particularly useful as fuels and as components of fuel and lubricating oil compositions. The same is particularly applicable to the hydrogenation of tertiary olefines and olefine polymers as isobutylene, diisobutylene, triisobutylene, diisoamylene, etc., which compounds are characterized by the possession of an unsaturated tertiary carbon atom, that is, an unsaturated carbon atom linked to three other carbon atoms. Olefine condensation products, for example, the unsaturated products obtained by condensing propylene with ethylene, tertiary butylene with propylene, secondary butylene with tertiary butylene, etc., may be hydrogenated. In accordance with my invention, the higher olefines may be readily hydrogenated by treatment with aliphatic secondary alcohols whereby a reaction mixture comprising the corresponding saturated hydrocarbon and a ketone is obtained.

Numerous material advantages are inherent in my process. If the invention is executed primarily to effect hydrogenation of olefines to valuable saturated products, a valuable carbonylic product as an aldehyde or ketone is also obtained. Conversely, if the object is to prepare aldehydes or ketones by dehydrogenation of the corresponding alcohols, said compounds may be obtained in excellent yields and in a pure condition, while at the same time, a valuable saturated hydrocarbon may be obtained. My process provides a practical, economical and improved method for the conversion of alcohols to the corresponding aldehydes or ketones. For example, when isopropyl alcohol is dehydrogenated to acetone by the conventional method, acetone due to its low vapor pressure is removed with great difficulty from the exit gas which, for the most part, consists of hydrogen. Efficient recovery of acetone therefrom requires costly compression and scrubbing equipment. Operation in accordance with my process obviates the employment of such additional costly equipment, since, if substantially equivalent molecular quantities or an excess of the unsaturated hydrogen acceptor are employed, substantially all of the hydrogen liberated is added to the double bond or bonds of the acceptor.

Other and further important objects of this invention and further material advantages inherent therein will become apparent from the disclosures in the following description and the appended claims.

The unsaturated compounds which I prefer to employ possess at least one olefinic linkage between two aliphatic carbon atoms regardless of the character of the compound embracing such a linkage. The olefines as ethylene, propylene, the butylenes, the amylenes, octylenes, etc., are contemplated, particularly those containing an unsaturated tertiary carbon atom. Olefines wherein one or more hydrogen atoms are substituted by suitable organic and/or inorganic radicals, as well as poly olefines and suitable substitution products thereof, may be used. A group of compounds advantageously employed includes the higher olefines and olefine polymers particularly those of branch chain structure as diisobutylene and the like.

I may employ the unsaturated compounds severally or treat mixtures comprising more than one species in which case mixed products will be obtained. In some cases, reaction may be advantageously effected in the presence of relatively unreactive substances as hydrocarbons, oils, inert gases and the like, which substances may be employed as diluents and/or solvents, or they may be added to facilitate separation and recovery of the end products of reaction or they may by virtue of their vapor pressure enable me to employ greater operating pressures. I may treat technical olefine-containing mixtures without separating the olefine or olefines therefrom. A typical fraction of this sort is the butane-butene cut which usually contains normal and iso butanes and butylenes and sometimes small amounts of diisobutylene. The use of pure or substantially pure olefinic material may prolong the life and activity of the catalyst employed and facilitate reaction control and recovery of pure products.

Hydrogenation is preferably effected with the unsaturated compound in contact with not less than an equivalent quantity of an organic oxy compound capable of being dehydrogenated under conditions at which the unsaturated compound is hydrogenated at a practical rate. In many cases, a substantial molecular excess of either of the reactants may be advantageously employed.

As the hydrogen donor, I may employ any suitable organic oxy compound which is capable of being dehydrogenated at a practical rate under conditions at which the unsaturated compound with which it is reacted is hydrogenated. The choice of a suitable dehydrogenatable oxy compound will be dependent upon the optimum conditions of hydrogenation of the unsaturated compound, the catalyst employed and upon the type of oxy reaction product desired. A preferred class of suitable oxy compounds includes the monohydric primary and secondary alcohols of aliphatic or alicyclic character. I preferably execute my invention with secondary alcohols, since the ketones which are obtained as reaction products are generally more valuable than the aldehydes and, further, losses due to polymerization and condensation are more easily obviated. As examples of suitable cyclic secondary alcohols, I may employ borneol, isoborneol, cyclohexanol, fenchyl alcohol and the like and obtain cyclic ketones as camphor, cyclohexanone, fenchone, etc. Generally, the invention is executed employing the aliphatic secondary monohydric alcohols as isopropyl, secondary butyl, secondary amyl, secondary hexyl and the like as well as their homologues, analogues and suitable substitution products. The secondary aliphatic alcohols are dehydrogenated to the corresponding aliphatic ketones as isopropyl alcohol to acetone, secondary butyl alcohol to methyl ethyl ketone, etc. The alcohols may be employed severally or mixtures comprising more than one species may be used in which case mixed products are obtained. In some cases, unsaturated primary and secondary alcohols may be employed and unsaturated aldehydes and ketones obtained.

The invention is executed in the presence of a catalyst which is capable of acting as a hydrogenation and dehydrogenation catalyst under the conditions of its use. The catalyst is generally chosen with respect to the compounds reacted, and the optimum conditions of its employment, so as to permit reaction at a practical rate under conditions at which a minimum of undesirable side reactions as decomposition, polymerization, condensation, etc., of the reactants and/or products can occur.

Excellent results may be obtained by employing the relatively inexpensive and readily regenerated base metal catalysts which possess the desired degree of activity. For example, metals as copper, chromium, thallium, nickel, iron and cobalt may be particularly active and efficacious catalysts when employed in a finely divided state or deposited on a suitable carrier. The oxides of the listed metals, particularly the oxides of nickel, aluminum, cerium, thorium, chromium and zirconium or mixtures comprising two or more of said oxides or one or more oxides with one or more metals, are suitable catalysts. I may advantageously employ catalysts possessing the desired activity selected from the group consisting of the noble metals as silver, gold, platinum, palladium, osmium, ruthenium, rhodium and iridium.

The catalysts may be prepared by any suitable method and employed severally or in combination. The metallic catalysts are preferably preformed and employed per se or deposited upon an inert substance or carrier such as pumice, calcium carbonate, silica gel, charcoal and the like. In many cases, the activity of a selected catalyst may be considerably enhanced by incorporating therewith small quantities of other substances capable of acting as promoters. A class of suitable promoters includes high melting and difficultly reducible oxygen-containing metal compounds, in particular, the oxides and oxygen-containing salts of elements such as the alkaline earth and rare earth metals, beryllium, magnesium, aluminum, copper, thorium, manganese, uranium, vanadium, columbium, tantalum, chromium, boron, zinc and titanium. A suitable group of promoters includes the difficultly soluble phosphates, molybdates, tungstates and selenates of the above listed metals, or the reduction products, containing oxygen, of such compounds, as for example the selenites.

I have found that my invention may be executed with excellent results employing a pyrophoric nickel metal catalyst. A pyrophoric nickel catalyst of great activity may be prepared by effecting the reduction and/or thermal decomposition of nickel salts of volatile organic acids. For example, nickel formate may be reduced and/or decomposed to an active nickel catalyst by heating it in an atmosphere of hydrogen or an inert gas at a temperature of from about 200° C. to about 350° C., or the nickel formate may be dissolved or suspended in a suitable inert liquid as a petroleum oil, hydrocarbon and the like and the mixture heated to the decomposition temperature of the nickel formate in the presence or absence of a reducing or substantially inert gas.

The temperature of execution of my invention will be dependent upon the activity of the specific catalyst selected, upon the optimum temperature of the reaction desired, upon the stability of the reactants and products, upon the contact time of the reactants and, to a certain extent, upon the pressure at which reaction is effected. Due to the fact that undesirable side reactions are usually accelerated at the higher temperatures, I prefer to operate at temperatures not generally exceeding about 500° C., although higher temperatures may be used when care is exercised to avoid the excessive occurrence of side reactions. When nickel is used as the catalyst, the process may be advantageously effected at temperatures of from about 150° C. to about 300° C.

The reaction may be effected at any desirable pressure depending upon the activity of the catalyst, upon the temperature and particular materials being reacted as well as upon whether reaction is effected in the liquid, vapor or liquid-vapor phase. The vapors of the materials to be reacted may be passed at the desired space velocity over the catalytic material heated to the desired temperature. The fluids leaving the reaction chamber may be cooled and the condensed liquid material conducted to a recovery stage wherein separation of the reaction products from each other and unreacted material, if any is present may be effected by distillation, extraction and the like suitable means.

Generally, I prefer to execute the invention under a superatmospheric pressure with at least one of the reactants in the liquid phase. The reactants and/or one or more relatively inert agents may be charged, in any desired state, severally or in admixture, to a suitable reaction vessel such as an autoclave or tubular reactor, which is equipped with heating means and preferably equipped with means for agitating its contents as by mechanical stirring. The catalytic material in the required amount may be added before, during or after introduction of the reactants to the reactor. When pyrophoric metal catalysts are employed, it is desirable to apply the catalytic material in such a manner that exposure to the air is substantially avoided. The amount of the catalyst to be employed is dependent upon the specific reaction catalyzed, the specific catalyst and the activity of said catalyst. When a finely divided metal as nickel is employed, the catalyst is generally applied in an amount equal to about 1% to 5% by weight of the materials reacted. However, considerable variation in this proportion may be made.

The reaction is preferably executed in the absence of air and other oxidizing gases, particularly when metal catalysts are used. The air may be substantially removed from the reaction vessel by sweeping it therefrom with the vapors of the reactants, or with a reducing gas as hydrogen, or a relatively inert gas as $CO_2$, $N_2$ and the like. If desired, the reaction vessel may be closed and air substantially completely removed therefrom by evacuation.

The reaction mixture is heated to the desired temperature and under the desired elevated pressure for a time sufficient to effect the desired degree of reaction. Agitation as by mechanical stirring is usually advantageous in that more intimate contact of the reactants and catalyst is effected.

The invention may be executed in closed reaction vessels with the reaction mixture under the total vapor pressure of its constituents at the operating temperature. The materials reacted may be selected with respect to their vapor pressures to effect operation under the requisite pressure without recourse to excessive temperatures, or the pressure in the reaction vessel may be built up by the introduction of volatile liquid or gaseous inert substances. The reaction products may be recovered from the reaction mixture by any suitable means such as fractionation, condensation, stratification, extraction and the like. Any unreacted reactants may be recovered and reutilized in the same or another reaction unit.

Other suitable modes of operation and modifications of those described will be apparent to those skilled in the art to which my invention appertains.

It will be understood that the reaction mass should be substantially free of catalyzer poisons as organic chlorides, sulphur and sulphur compounds. Reactants and diluent materials as hydrocarbons and the like containing material capable of deleteriously effecting the life and activity may be purified in accordance with known methods prior to their use.

Reference will be had to the following specific example which illustrates a preferred mode of executing my invention. It is to be understood that the invention is not to be limited to the materials and conditions of this example.

*Example*

About 500 gm. (4.45 mols) of diisobutylene and about 267.3 gm. (4.45 mols) of isopropyl alcohol were charged to a metal autoclave equipped with heating means and means for agitating its contents by mechanical stirring. The air in the autoclave was displaced by nitrogen and about 20 gm. of a finely divided nickel catalyst were added. The autoclave was closed and the mixture stirred and heated to a temperature of about 250° C. Reaction was effected at a gauge pressure of about 600 lbs./sq. in. at 250° C. which pressure was principally due to the total vapor pressure of the constituents of the reaction vessel at that temperature.

The reaction was substantially complete in about one hour. At the end of this time the reaction mixture was cooled and discharged from the reaction vessel. The acetone was extracted from the reaction mixture with water. The residue after extraction was dried and distilled. The distillate was substantially pure iso-octane (2,2,4-trimethyl pentane) which was obtained in a yield of about 94% of the theoretical.

The acetone was recovered by fractionating the aqueous extractant solution.

It is seen that the process provides a convenient method for producing acetone while at the same time preparing iso-octane which is a valuable hydrocarbon fuel or fuel component. By my method, operations involving the collecting, scrubbing and compressing of hydrogen are eliminated.

The higher olefines and olefine polymers produced commercially from petroleum and petroleum products are many times contaminated with sulphur and sulphur compounds which are difficult to remove to the extent that catalysts sensitive to poisoning as nickel are not deleteriously effected. For example, with active nickel, diisobutylene containing more than about 0.01% total sulphur cannot be advantageously hydrogenated due to catalyst poisoning. In accordance with my invention, I may advantageously hydrogenate olefinic material containing more than 0.01% sulphur by effecting reaction with an oxy compound containing relatively less sulphur whereby the reaction mixture contains an amount of sulphur less than that contained originally in the olefinic material. For example, isopropyl alcohol containing less than 0.004% sulphur is readily obtainable. Such isopropyl alcohol can be reacted with diisobutylene containing more than 0.01% sulphur resulting in a reaction mixture containing less than 0.01% sulphur. A reaction mixture containing less than 0.01% sulphur has substantially no deleterious effect on the life and activity of the nickel catalyst.

My invention may be executed in a plurality of communicating reaction vessels in such a manner that dehydrogenation is effected in one reaction vessel and hydrogenation in another, the hydrogen liberated in the first stage being conducted to a hydrogenation stage for utilization therein. Numerous advantages are inherent in this mode of operation, particularly when the organic products of dehydrogenation are readily volatile. In the dehydrogenation of isopropyl alcohol to acetone, the liberated hydrogen contains acetone in the vapor state in such small amounts as to render its recovery therefrom costly and impractical. In accordance with the present invention, the recovery of such volatile carbonylic products is facilitated by increasing their concentration in the gaseous mixture by removal of hydrogen therefrom. This may be accomplished by reacting the relatively dilute gaseous mixture with a suitable unsaturated compound in the presence of a hydrogenation catalyst at a temperature at which the unsaturated compound is hydrogenated thereby decreasing the hydrogen content of the mixture and increasing the effective concentration of the carbonylic compound.

It will be apparent to those skilled in the art that my invention may be executed in a batch, intermittent or continuous manner.

As many apparently different embodiments of this invention may be made without departing from the scope thereof, it is to be understood that the same is not to be regarded as limited to the details and materials of operation herein described but is to be limited only by the terms of the appended claims.

I claim as my invention:

1. A process for effecting the catalytic hydrogenation and dehydrogenation of organic compounds which comprises heating an unsaturated compound possessing an olefinic linkage between two aliphatic carbon atoms with an alcohol containing at least one non-tertiary carbinol group, in the presence of a hydrogenation catalyst at an elevated temperature not substantially greater than about 500° C.

2. A process for effecting the catalytic hydrogenation and dehydrogenation of organic compounds which comprises heating an unsaturated aliphatic compound containing an olefinic linkage between two carbon atoms with an alcohol containing at least one non-tertiary carbinol group in the presence of a hydrogenation catalyst at an elevated temperature not substantially greater than about 500° C.

3. A process for effecting the catalytic hydrogenation and dehydrogenation of organic compounds which comprises heating an olefine possessing an unsaturated tertiary carbon atom with an alcohol containing at least one non-tertiary carbinol group in the presence of a hydrogenation catalyst at an elevated temperature not substantially greater than about 500° C.

4. A process for effecting the catalytic hydrogenation and dehydrogenation of organic compounds which comprises heating an olefine with an alcohol containing at least one non-tertiary carbinol group compound in the presence of a hydrogenation catalyst at an elevated temperature not greater than about 500° C.

5. A process for effecting the catalytic hydrogenation and dehydrogenation of organic compounds which comprises heating an olefine with an alcohol containing at least one non-tertiary carbinol group under a superatmospheric pressure in the presence of a hydrogenation catalyst at an elevated temperature not substantially greater than about 500° C., and recovering the reaction products.

6. A process for effecting the catalytic hydrogenation and dehydrogenation of organic compounds which comprises heating an unsaturated compound possessing an olefinic linkage between two aliphatic carbon atoms with a compound of the class consisting of monohydric primary alcohols containing at least two carbon atoms and secondary alcohols, in the presence of a hydrogenation catalyst, at an elevated temperature not substantially greater than about 500° C.

7. A process for effecting the catalytic hydrogenation and dehydrogenation of organic compounds which comprises heating an olefine with an aliphatic monohydric primary alcohol containing at least two carbon atoms in the presence of a hydrogenation catalyst at an elevated temperature not substantially greater than about 500° C.

8. A process for effecting the catalytic hydrogenation and dehydrogenation of organic compounds which comprises heating an olefine with a monohydric secondary alcohol in the presence of a hydrogenation catalyst at an elevated temperature not substantially greater than about 500° C.

9. A process for effecting the catalytic hydrogenation and dehydrogenation of organic compounds which comprises heating an unsaturated aliphatic compound containing an olefinic linkage between two carbon atoms possessing an unsaturated tertiary carbon atom with a monohydric secondary alcohol in the presence of a hydrogenation catalyst at an elevated temperature not substantially greater than about 500° C.

10. A process for effecting the catalytic hydrogenation and dehydrogenation of organic compounds which comprises heating an olefine with an aliphatic monohydric secondary alcohol in the presence of a hydrogenation catalyst at an elevated temperature not greater than about 500° C.

11. A process for effecting the catalytic hydrogenation and dehydrogenation of organic compounds which comprises heating an olefine with a monohydric secondary alcohol under a superatmospheric pressure and in the liquid phase in the presence of a hydrogenation catalyst at an elevated temperature not substantially greater than about 500° C. for a time sufficient to effect substantially complete reaction.

12. A process for effecting the catalytic hydrogenation and dehydrogenation of organic compounds which comprises heating an olefine with substantially an equimolecular quantity of a monohydric secondary alcohol under a superatmospheric pressure and in the liquid phase in the presence of an active catalyst comprising metallic nickel at a temperature not greater than about 500° C. for a time sufficient to effect substantially complete reaction, and recovering the saturated hydrocarbon and ketone.

13. A process for the preparation of 2,2,4-trimethyl pentane and acetone which comprises heating diisobutylene with isopropyl alcohol in the presence of a hydrogenation catalyst at an elevated temperature not substantially greater than about 500° C.

14. A process for the preparation of 2,2,4-trimethyl pentane and acetone which comprises heating diisobutylene with substantially an equimolecular quantity of isopropyl alcohol under a superatmospheric pressure in the liquid phase in the presence of an active nickel catalyst at a temperature of from about 150° C. to about 300° C. for a time sufficient to effect substantially complete reaction.

15. A process for the hydrogenation of an olefine which comprises reacting an unsaturated aliphatic compound containing an olefinic linkage between two carbon atoms with an excess of a readily dehydrogenatable organic oxy compound in the presence of a hydrogenation catalyst at an elevated temperature not substantially greater than about 500° C.

16. A process for the hydrogenation of an olefine which comprises reacting an olefine with at least an equimolecular quantity of a monohydric secondary alcohol in the presence of a hydrogenation catalyst at an elevated temperature not substantially greater than about 500° C.

17. A process for the production of 2,2,4-trimethyl pentane which comprises reacting diisobutylene with an aliphatic monohydric secondary alcohol in the presence of a hydrogenation catalyst at an elevated temperature not greater than about 500° C.

18. In a process for effecting the catalytic hydrogenation and dehydrogenation of organic compounds, the step which comprises reacting a gaseous mixture containing free hydrogen and a carbonylic compound of the class consisting of aldehydes and ketones with an unsaturated compound possessing an olefinic linkage between two aliphatic carbon atoms in the presence of a hydrogenation catalyst at a temperature at which hydrogenation occurs whereby the concentration of the carbonylic compound in the gaseous mixture is increased and its removal therefrom facilitated.

19. In a process for effecting the catalytic hydrogenation and dehydrogenation of organic compounds, the step of hydrogenating an unsaturated organic compound possessing an olefinic linkage between two aliphatic carbon atoms and containing sulphur compounds in the presence of a hydrogenation catalyst which has a limited tolerance against poisoning due to sulphur compounds, comprising mixing the unsaturated compound with a sufficient quantity of an alcohol containing at least one non-tertiary carbinol group which is substantially free of sulphur compounds to reduce the sulphur content of the mixture to such an extent that the catalyst is unaffected thereby, and heating the mixture to an elevated temperature not substantially greater than about 500° C.

20. A process for effecting the catalytic hydrogenation and dehydrogenation of organic compounds which comprises heating an unsaturated compound possessing an olefinic linkage between two aliphatic carbon atoms with an alcohol containing at least one non-tertiary carbinol group in the liquid phase and under a superatmospheric pressure in the presence of a hydrogenation catalyst at an elevated temperature not substantially greater than about 500° C. for a time sufficient to effect substantially complete reaction.

21. A process for effecting the catalytic hydrogenation and dehydrogenation of organic compounds which comprises heating an unsaturated compound possessing an olefinic linkage between two aliphatic carbon atoms with a monohydric alcohol in the liquid phase in the presence of an active hydrogenation catalyst comprising metallic nickel at an elevated temperature not substantially greater than about 500° C.

22. A process for effecting the hydrogenation and dehydrogenation of organic compounds which comprises heating an unsaturated compound possessing an olefinic linkage between two aliphatic carbon atoms at least one of which is tertiary with a monohydric alcohol in the liquid phase under a superatmospheric pressure in the presence of a hydrogenation catalyst at an elevated temperature not substantially greater than about 500° C.

MARION D. TAYLOR.